United States Patent
Huelke et al.

(10) Patent No.: US 9,561,755 B2
(45) Date of Patent: *Feb. 7, 2017

(54) VEHICLE GARMENT HOOK ASSEMBLY

(71) Applicant: Ford Global Technologies, LLC, Dearborn, MI (US)

(72) Inventors: David R. Huelke, Milan, MI (US); Guillermo Alanis, Naucalpan (MX); Jeff Todd Baxter, Carleton, MI (US); John Andrew Stakoe, Bloomfield Hills, MI (US); Mike Popovski, Utica, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,064

(22) Filed: Jul. 28, 2014

(65) Prior Publication Data

US 2014/0332575 A1    Nov. 13, 2014

Related U.S. Application Data

(63) Continuation-in-part of application No. 13/564,448, filed on Aug. 1, 2012, now Pat. No. 8,820,597.

(51) Int. Cl.
*B60R 7/10* (2006.01)

(52) U.S. Cl.
CPC ..................... *B60R 7/10* (2013.01)

(58) Field of Classification Search
CPC .............. B60R 7/10; B60R 7/08; B60N 3/023
USPC ....... 224/311, 313, 553, 544, 556, 557, 567, 224/570, 281, 282; 16/438, 444, 445; 248/291.1, 294.1, 304, 308
See application file for complete search history.

(56) References Cited

U.S. PATENT DOCUMENTS

| | | | |
|---|---|---|---|
| 2,390,257 A | 12/1945 | Jahn | |
| 3,385,547 A | 5/1968 | West | |
| 4,221,354 A | 9/1980 | Kempkers | |
| 4,720,028 A | 1/1988 | Takemura et al. | |
| 4,787,590 A | 11/1988 | Melvin | |
| 5,507,423 A | 4/1996 | Fischer et al. | |
| 5,542,591 A * | 8/1996 | Moore | B60R 7/005 160/388 |
| 5,685,470 A * | 11/1997 | Moore | B60R 7/005 224/567 |
| 5,769,294 A | 6/1998 | Heinz et al. | |
| 6,076,233 A | 6/2000 | Sasaki et al. | |

(Continued)

FOREIGN PATENT DOCUMENTS

| | | | | |
|---|---|---|---|---|
| FR | 2897029 A3 | * | 8/2007 | ............... B60R 7/08 |
| SE | 2617603 A1 | * | 7/2013 | ............... B60R 5/04 |

OTHER PUBLICATIONS

Duluth Trading Co., "P38 Dog Guard Installation or Removal," Feb. 1, 2012 (2 pages).

*Primary Examiner* — Corey Skurdal
(74) *Attorney, Agent, or Firm* — Vichit Chea; Price Heneveld LLP (57) ABSTRACT

A vehicle garment hook assembly for use on a vehicle includes a housing mounted to a trim component on a vehicle, and a garment hook pivotally mounted to the housing and pivotal away from the housing to a use position. The garment hook assembly also includes an access aperture formed in the housing, and a cover movably coupled to the housing to cover the garment hook and access aperture in a closed position and to expose the garment hook and access aperture in an open position.

18 Claims, 8 Drawing Sheets

(56) References Cited

U.S. PATENT DOCUMENTS

| | | |
|---|---|---|
| 6,095,469 A | 8/2000 | Von Alman |
| 6,397,435 B1 | 6/2002 | Gosselet |
| 6,643,897 B2 | 11/2003 | Chang |
| 6,663,067 B2 | 12/2003 | Gordon |
| 6,908,269 B1 | 6/2005 | Youngs et al. |
| 6,968,601 B2 | 11/2005 | Bivens et al. |
| 7,103,939 B2 | 9/2006 | Belchine, III et al. |
| 7,669,821 B2 | 3/2010 | Martin |
| 7,988,115 B2 | 8/2011 | Lee et al. |
| 8,079,446 B2 | 12/2011 | Nemoto |
| 8,240,625 B2 | 8/2012 | Kato |
| 8,272,548 B2 | 9/2012 | Le Texier et al. |
| 8,550,417 B2 | 10/2013 | Lee et al. |
| 8,677,569 B2 | 3/2014 | Ruzich et al. |
| 8,733,830 B2 | 5/2014 | Sanchez |
| 2005/0076471 A1 | 4/2005 | Watanabe et al. |
| 2007/0228702 A1 | 10/2007 | Ono et al. |

\* cited by examiner

FIG. 12A

VEHICLE GARMENT HOOK ASSEMBLY

CROSS-REFERENCE TO RELATED APPLICATION

This application is a continuation-in-part of U.S. patent application Ser. No. 13/564,448, filed on Aug. 1, 2012, now U.S. Pat. No. 8,820,597, entitled "VEHICLE GARMENT HOOK AND GUARD MOUNTING ASSEMBLY." The aforementioned related application is hereby incorporated by reference.

FIELD OF THE INVENTION

The present invention generally relates to a garment hook for a vehicle interior, and more particularly to a combination pivotable garment hook and guard mounting assembly.

BACKGROUND OF THE INVENTION

The interior of an automotive vehicle typically includes a coat hook mounted along the edge of the roof structure. Clothing, clothes hangers and the like can be hung from the coat hook to permit the hanging of articles while traveling. The coat hook may be stationary, retractable, or may be recessed into the headliner.

Additionally, often-pet owners need to transport pets, such as dogs, in their vehicle. Devices may be used which separate the driver's compartment from the cargo area to keep pets from interfering with the driver while driving. These devices can be formed of metal or aluminum, netting, straps, and can be affixed to the vehicle interior in a variety of ways.

SUMMARY OF THE INVENTION

One aspect of the present invention is directed to a vehicle garment hook assembly. The vehicle garment hook assembly includes a housing mounted to a trim component on a vehicle, a garment hook pivotally mounted to the housing, and an access aperture formed in the housing. The garment hook pivots outward away from the housing to a use position, and the access aperture allows access to an underlying vehicle body structure.

Another aspect of the present invention is directed to a vehicle garment hook assembly that includes a housing mounted to a trim component on a vehicle and a garment hook pivotally mounted to the housing and pivotal away from the housing to a use position. The vehicle garment hook assembly also includes an access aperture formed in the housing, and a cover movably coupled to the housing to cover the garment hook and access aperture in a closed position and to expose the garment hook and access aperture in an open position.

According to a further aspect of the present invention, a vehicle garment hook assembly is provided that includes a housing mounted to a component on a vehicle, a garment hook pivotally mounted to the housing, and a cover movably coupled to the housing to cover the garment hook. The garment hook pivots outward away from the housing to a use position when the door is in an open position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
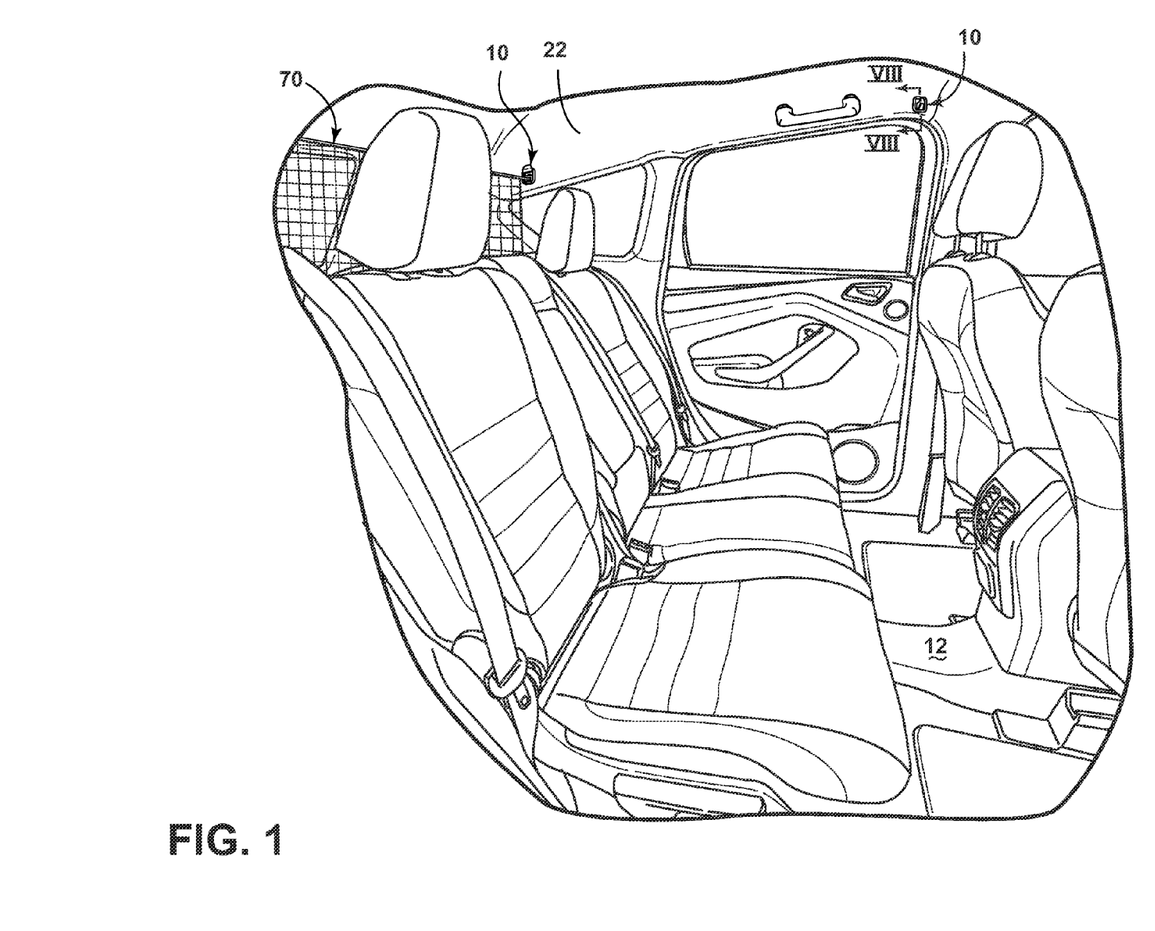
FIG. 1 is a top perspective view of a garment hook and guard mount assembly disposed inside a vehicle.
Figure 10:
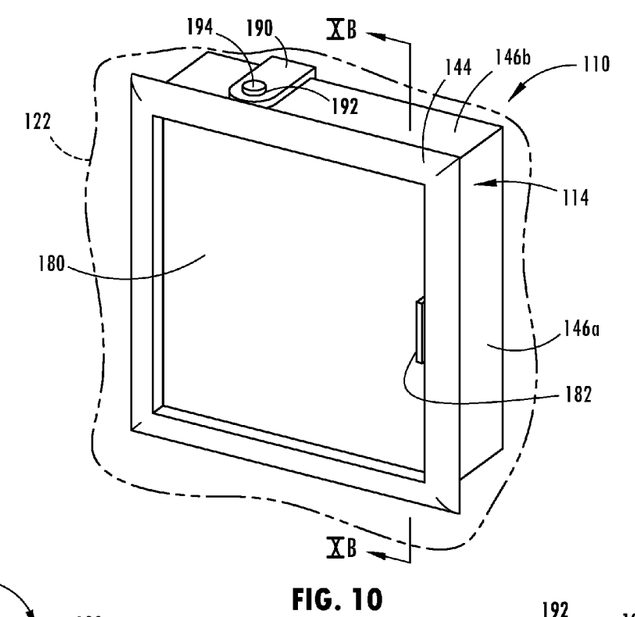
FIG. 10 is an elevated perspective view of a garment hook and guard mount assembly with a cover door in the closed position, according to another embodiment.
Figure 10A:
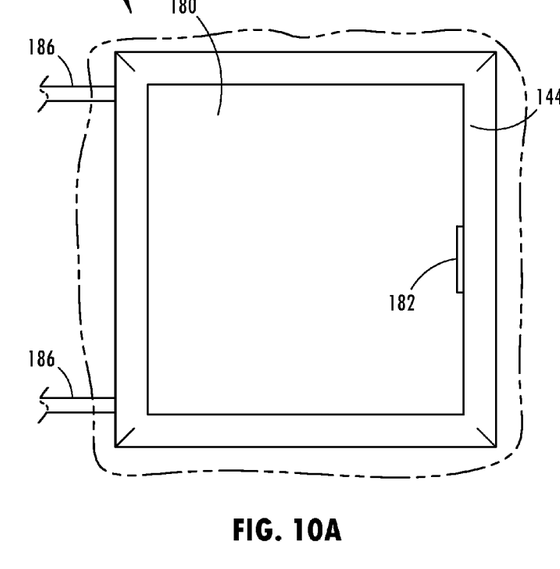
FIG. 10A is a front view of the garment hook and guard mount assembly shown in FIG. 10.
Figure 10B:
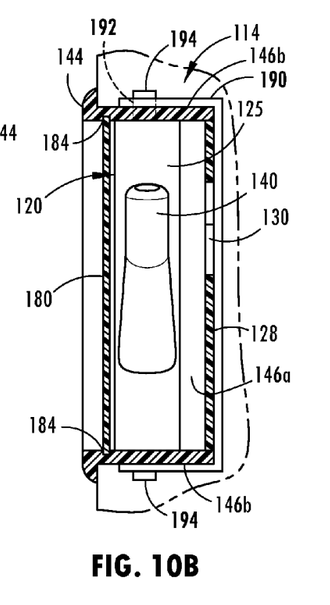
FIG. 10B is a cross-sectional view of the garment hook and guard mount assembly taken through line XB-XB of FIG. 10.

For purposes of description herein, the terms "upper," "lower," "right," "left," "rear," "front," "vertical," "horizontal," "interior," "exterior," and derivatives thereof shall relate to the garment hook and guard mount assembly as oriented in FIGS. 1 and 10. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, reference numeral 10 generally designates a garment hook and guard mount assembly, referred to herein as "mount assembly," for use in an automotive vehicle interior 12. The mount assembly 10 includes a housing 14, a cover 16 that is slidingly coupled to the housing 14 and has an aperture 18 therethrough, and a garment hook 20 pivotally mounted to the housing 14. The housing 14 is mounted to a trim component 22 having a complementary aperture 24 therethrough such that pivoting the garment hook 20 away from the housing 14 exposes a passageway 26 through the cover and trim component apertures 18, 24 for access to an underlying vehicle body structure 28.

In the illustrated embodiment, the trim component 22 is shown in the form of a headliner; however, other trim components, including pillar trim, interior panels, and the like are contemplated according to other embodiments. Further, the underlying vehicle body structure 28 is shown in the form of a roof structure; however, other body structures, including pillars, body panels, and the like are contemplated according to other embodiments.

The headliner 22 may be a formed and molded headliner for mounting to the interior of the roof structure 28 of the vehicle, so as to provide an aesthetically pleasing appearance for the interior 12 thereof. The headliner 22 is shaped to conform to the roof structure 28 and may include a plurality of contours and apertures for mounting various overhead components, such as sun visors, overhead consoles, grab handles, lights, and the like. The roof structure 28 includes a pair of spaced side rails, and at least front and rear headers, and may also include additional roof bows, as is conventional.

Referring now to FIGS. 2-5, the garment hook 20 includes a hook portion 40 and a plate portion 42. The hook portion 40 terminates in a tip, and the plate portion 42 is disposed at a base of the hook portion 40. The hook portion 40 and the plate portion 42 are substantially perpendicular to one another.

The housing 14 includes a bezel 44 and sidewalls 46. In the illustrated embodiment, the housing 14 is shown having a rectangular shape with pairs of opposed sidewalls 46; however, other housing shapes, and sidewall configurations, are also contemplated according to other embodiments. Sidewalls 46a are disposed along the long sides of the housing 14, and sidewalls 46b are disposed along the short sides of the housing 14. Each sidewall 46a has a track 48 that protrudes a small distance into the center of the housing 14. Additionally, a stop member 50 is disposed on an interior face of at least one of the sidewalls 46a, and is positioned near a top portion 52 of the housing 14. A second stop member 54 is disposed on the interior face of at least one of the sidewalls 46a, and is positioned near a lower portion 56 of the housing 14. Further, an elongated opening 58 (FIG. 7) is disposed through the short sidewall 46b located on the lower portion 56 of the housing 14.

Figure 7:
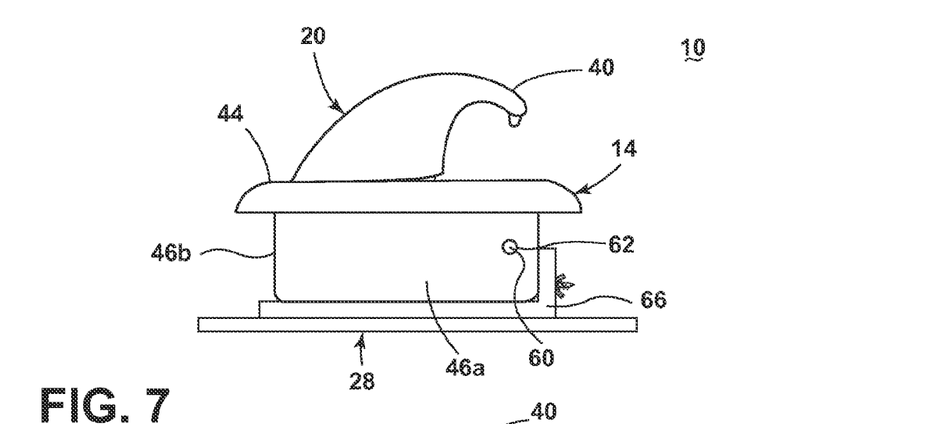
FIG. 7 is a side view of the garment hook and guard mount assembly of FIG. 1, the underlying vehicle body structure, and the bracket.
Figure 8:
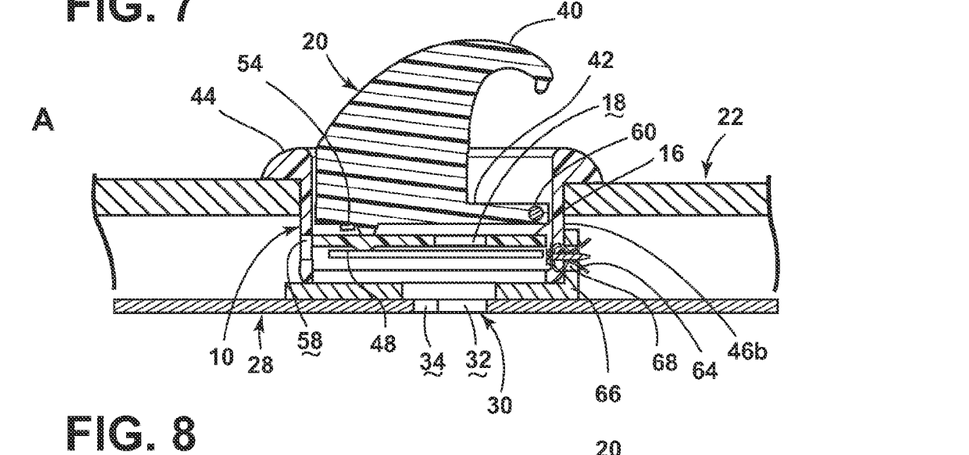
FIG. 8 is a cross-sectional side view taken along line VIII-VIII of FIG. 1, illustrating the assembly in a lowered position.
Figure 9:
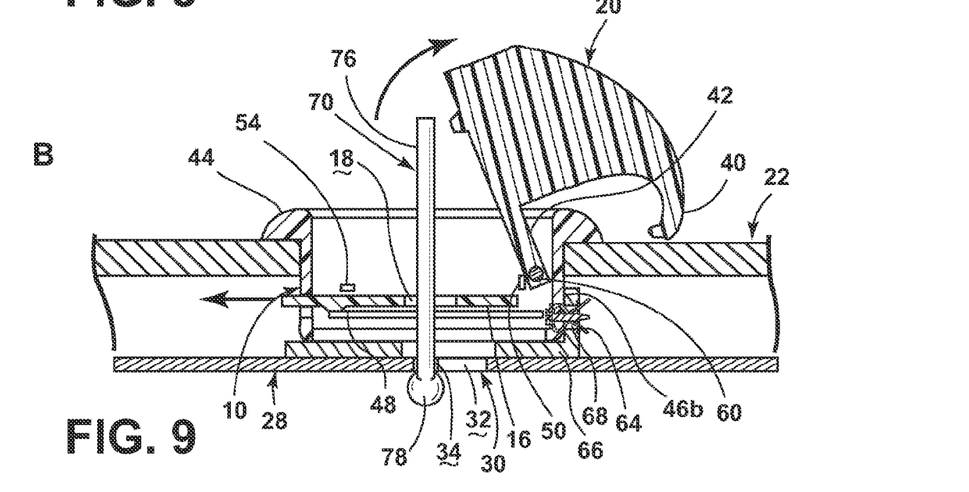
FIG. 9 is a cross-sectional side view taken along line VIII-VIII of FIG. 1, illustrating the assembly in an open position, with the guard mounted thereto.

Referring now to FIGS. 7-9, the housing 14 also includes a fastener 64 mounted on an exterior face of the short sidewall 46b, at the top portion 52 of the housing 14. The fastener 64 can be coupled to the short sidewall 46b by a threaded fastener, or any other suitable attachment means. Further, a complementary aperture 68 is located in a bracket 66 that is affixed to the roof structure 28. When installed, the fastener 64 is retained within the aperture 68. The bracket 66 can be welded, or coupled by any suitable means, to the roof structure 28, and is disposed between the headliner 22 and the roof structure 28. The fastener 64 and bracket 66 are configured to couple the housing 14 and mount assembly 10 to the roof structure 28 when installed in the vehicle. Additionally, fastener 64 and bracket 66 provide support to the mount assembly 10 when a load is applied to the garment hook 20. Alternatively, the fastener 64 can be retained by an aperture in the roof structure 28.

Referring back to FIGS. 2-5, the cover 16 is a substantially flat, rectangular member and is substantially the same shape as the housing 14 perimeter. The aperture 18 extends through the cover 16 and is positioned at the center of the cover 16, though it could be positioned nearly anywhere on the cover 16.

The garment hook 20 and cover 16 are each independently mounted to the housing 14. Specifically, the garment hook 20 is pivotally mounted to the housing 14 by a pivot pin 60. The pivot pin 60 is disposed near the top portion 52 of the plate portion 42 of the garment hook 20. The pivot pin 60 may be affixed to the plate portion 42 by any suitable means, including insert molding, friction fit, and adhesive. The ends of the pivot pin 60 are received in coordinating holes 62 through the long sidewalls 46a of the housing 14. The cover 16 is inserted into the elongated opening 58 (FIG. 7) in the short sidewall 46b of the housing 14. The sides of the cover 16 are supported by the tracks 48 that extend along a substantial length of the long sidewalls 46a. The cover 16 is configured to be able to slide along the tracks 48 within the housing 14.

Figure 2:
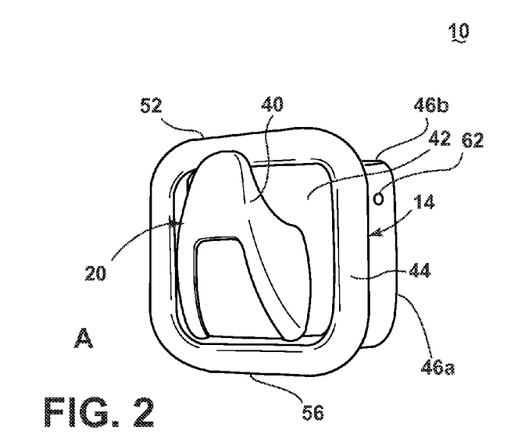
FIG. 2 is a side perspective view of the garment hook and guard mount assembly of FIG. 1 in a lowered position.
Figure 3:
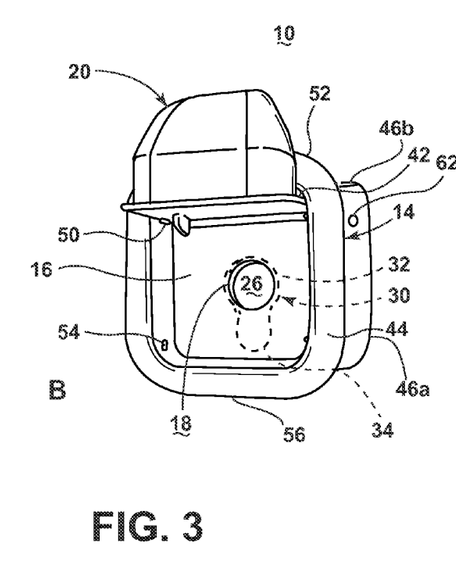
FIG. 3 is a side perspective view of the garment hook and guard mount assembly of FIG. 1 and an underlying vehicle body structure, illustrating an open position.
Figure 4:
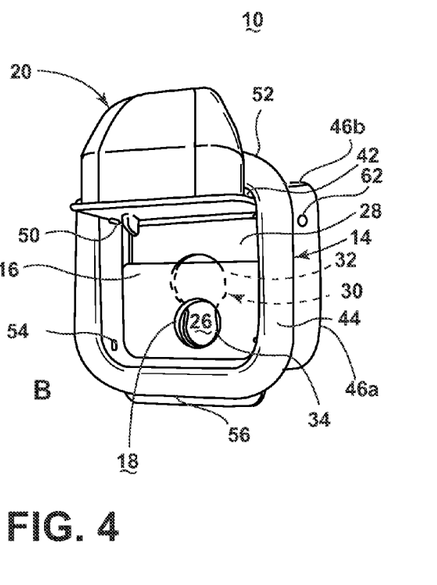
FIG. 4 is a side perspective view of the garment hook and guard mount assembly of FIG. 1 and the underlying vehicle body structure, illustrating an open position with a cover slid down.
Figure 5:
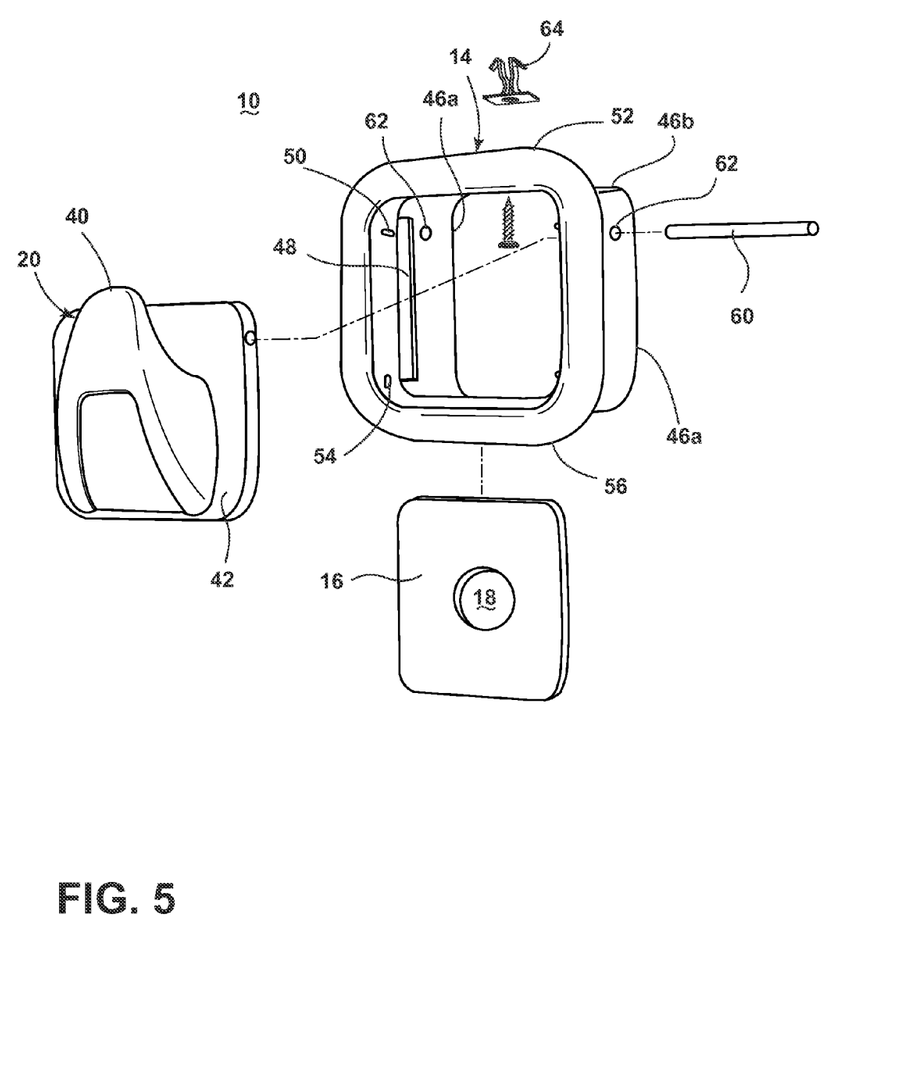
FIG. 5 is an exploded side perspective view of the garment hook and guard mount assembly of FIG. 1.

The garment hook 20 may be pivoted about the pivot pin 60 from the initial, lowered position A shown in FIG. 2, to an open position B, shown in FIGS. 3 and 4. In the lowered position A, the garment hook 20 is prevented from pivoting too far into the housing 14 by the pair of second stop members 54 located on the inner face of the sidewalls 46a. The second stop members 54 protrude out from the sidewalls 46a, creating a stop to limit the rotation of the plate portion 42 and garment hook 20. Additionally, when a load is applied to the hook portion 40, for example, a clothes hanger holding an article of clothing, the second stop members 54 prevent the garment hook 20 from over rotating.

When the garment hook 20 is pivoted away from the housing 14 to the open position B, it is maintained in the open position B by the pair of stop members 50 which are located on the inner face of the sidewalls 46a. Similar to the second stop members 54, the stop members 50 protrude out from the sidewalls 46a. However, the stop members 50 are configured such that a measure of force must be used to pivot the plate portion 42 of the garment hook 20 beyond the stop members 50. Once the plate portion 42 has passed by the stop members 50, the stop members 50 retain the garment hook 20 in the open position B. Oppositely, a measure of force must be used to again overcome the stop member 50 to pivot the garment hook 20 back to the lowered position A.

Figure 6:
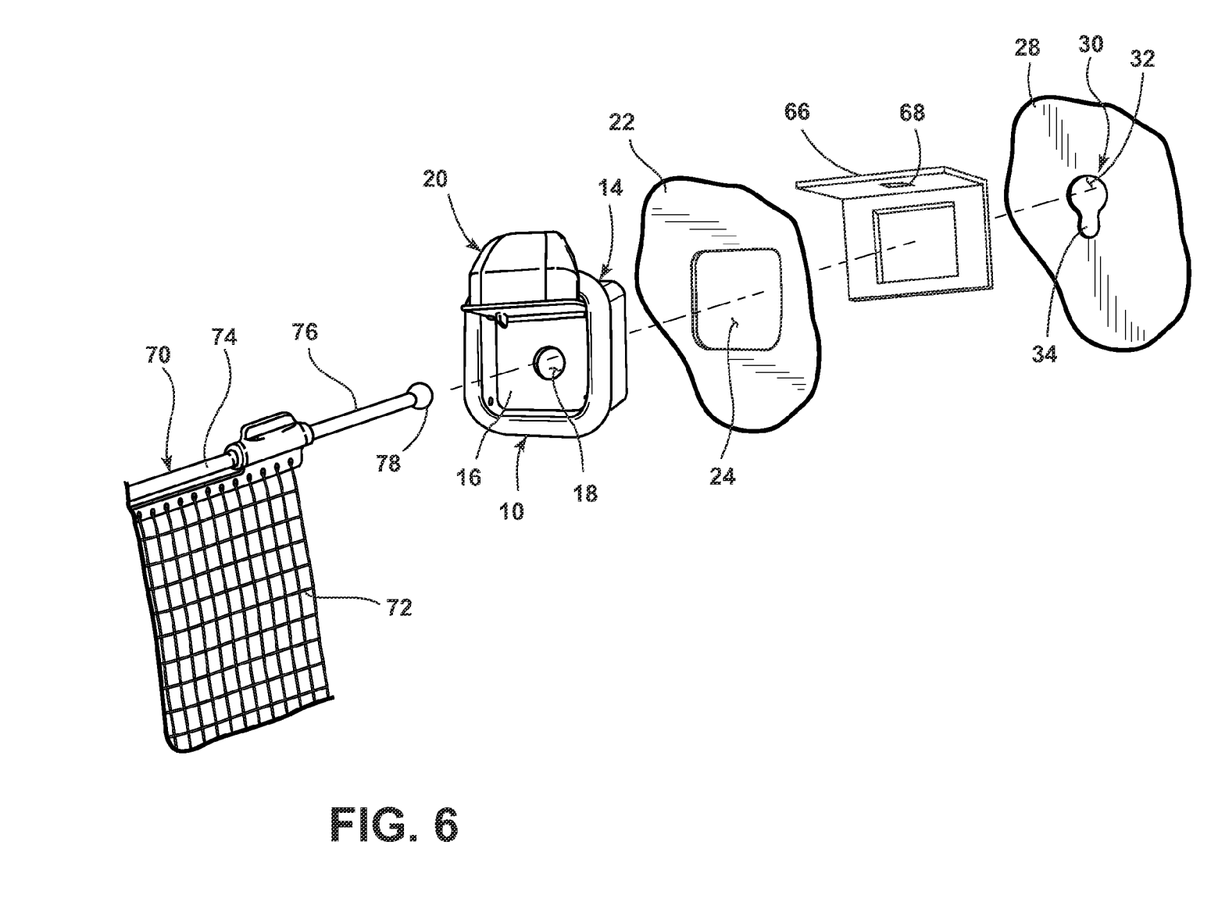
FIG. 6 is a partially exploded view of the garment hook and guard mount assembly, showing a trim component, underlying vehicle body structure, a bracket, and a guard for mounting thereto.

Referring now to FIG. 6, according to one embodiment, the mount assembly 10 may be used to provide access from the interior 12 of the vehicle to the underlying vehicle body structure 28. In the illustrated embodiment, the underlying vehicle body structure 28 is shown in the form of the roof structure, and may be a side rail. Additionally, the roof structure 28 includes a keyhole slot 30 extending therethrough; the keyhole slot 30 having a hole 32 and a tapered slot 34.

A guard 70 may be selectively used in conjunction with the mount assembly 10. The guard 70 can be removably coupled to the mount assembly 10 to partition the passenger space from the remaining rearward interior 12 of the vehicle. The guard 70 and mount assembly 10 may be disposed behind the driver/front passenger seats, behind the backseat passenger seats, or may be disposed at both locations. The guard 70 can be used to confine dogs or other animals to the areas behind the front seats or back seats, depending upon the location to which the guard 70 is installed.

In the illustrated embodiment, the guard 70 is shown having a net 72; however, other structures that provide a barrier, such as a screen, straps, tubular fencing, and the like are contemplated according to other embodiments. The guard 70 further includes a support rod 74 that has a fitting 76 at each end thereof, the fitting 76 terminating in a bulbous head 78. The net 72 is mounted on the support rod 74, spanning substantially the width of the vehicle. When installed, the fitting 76 passes through the passageway 26. Stated differently, the fitting 76 is disposed in the aperture 18 in the cover 16 and the aperture 24 in the headliner 22. Further, the fitting 76 is retained in the keyhole slot 30 located in the roof structure 28.

Referring to FIGS. 7-9, when desired to utilize the guard 70, it may be installed into the mount assembly 10 according to the following method. To begin, the garment hook 20 is pivoted up, about pivot pin 60, to the open position B (FIG. 9), thereby exposing the cover 16 and passageway 26 (FIG. 3). Further, stop members 50 retain the garment hook 20 in the open position B, as previously described. Next, the support rod 74 of the guard 70 is moved into alignment; inserting the fitting 76 into the passageway 26 such that the head 78 passes through the hole 32 of the keyhole slot 30. To lock the guard 70 into position, the user moves the fitting 76 into the slot 34 of the keyhole slot 30. This motion causes the cover 16 to slide within the housing 14 and the enlarged head 78 to engage the slot 34, releasably locking the support rod 74 to the roof structure 28. The guard 70 may be removed in an opposite fashion.

It should easily be understood by one having ordinary skill in the art that the shape of the keyhole slot 30 could be different according to another embodiment. Other locking slot configurations, known to those skilled in the art, are also feasible. Additionally, it is also contemplated, according to another embodiment that the fitting 76 and enlarged head 78 could be positioned on the roof structure 28, and the keyhole slot 30 could be provided on the end of the support rod 74.

The garment hook and guard mount assembly 10 described herein enables multiple functionalities for a single trim component. In the case that the vehicle owner does not have a pet, or does not need or care to use the guard 70, the mount assembly 10 may be utilized for the garment hook 20, to hang articles of clothing or such. Alternatively, for the owner who does have a pet and wants to use the guard 70, the mount assembly 10 can selectively be used as desired: a garment hook 20 or an attachment means for the guard 70, whichever the user currently desires. The mount assembly 10 and installed guard 70 prevent the contained pet from climbing, leaping, or otherwise moving forward from the rear luggage or cargo portion of the vehicle and into the seating portions of the vehicle, which may be occupied by a driver or passengers.

Referring to FIGS. 10-12A, a garment hook and guard mount assembly 110, also referred to herein as "mount assembly," is illustrated, according to another embodiment. The mount assembly 110 may be used in an automotive vehicle interior as shown in FIG. 1. The mount assembly 110 includes a housing 114 which generally includes a pair of upstanding left and right side walls 146a connected to a pair of top and bottom walls 146b and a front bezel 144. The housing 114 is mounted to a trim component 122, which is shown in one embodiment as a headliner. However, other trim components, such as pillar trim, interior panels, and the like are contemplated according to other embodiments. Underlying the housing 114 is a vehicle support structure 128. An underlying vehicle body structure 128 is shown in one embodiment as a roof structure, however, other body structures including pillars, body panels, and the like are contemplated according to other embodiments. The vehicle body structure 128 and trim component 122 may be configured as shown and described above in connection with the other embodiment.

Figure 11:
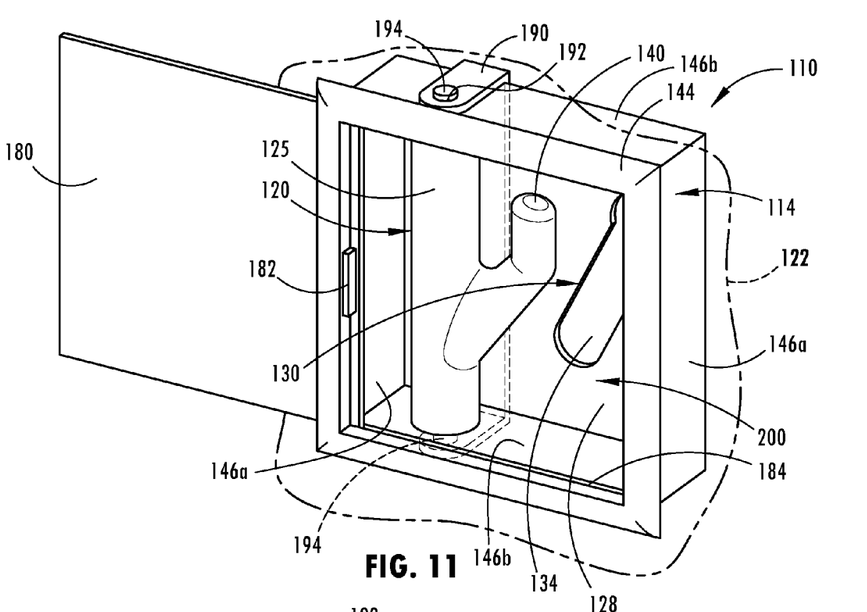
FIG. 11 is an elevated perspective view of the garment hook and guard mount assembly of FIG. 10 with the door shown in the open position.
Figure 11A:
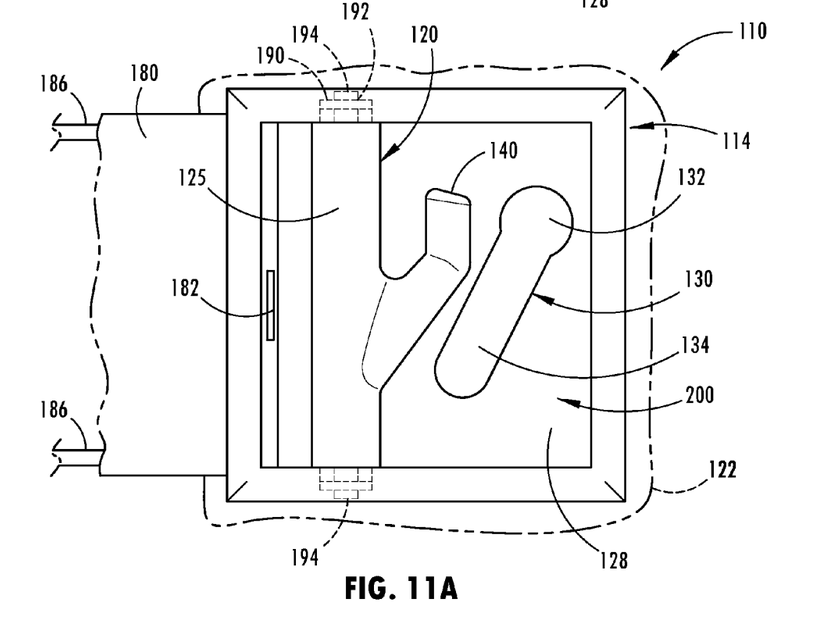
FIG. 11A is a front view of the garment hook and guard mount assembly of FIG. 11.
Figure 12:
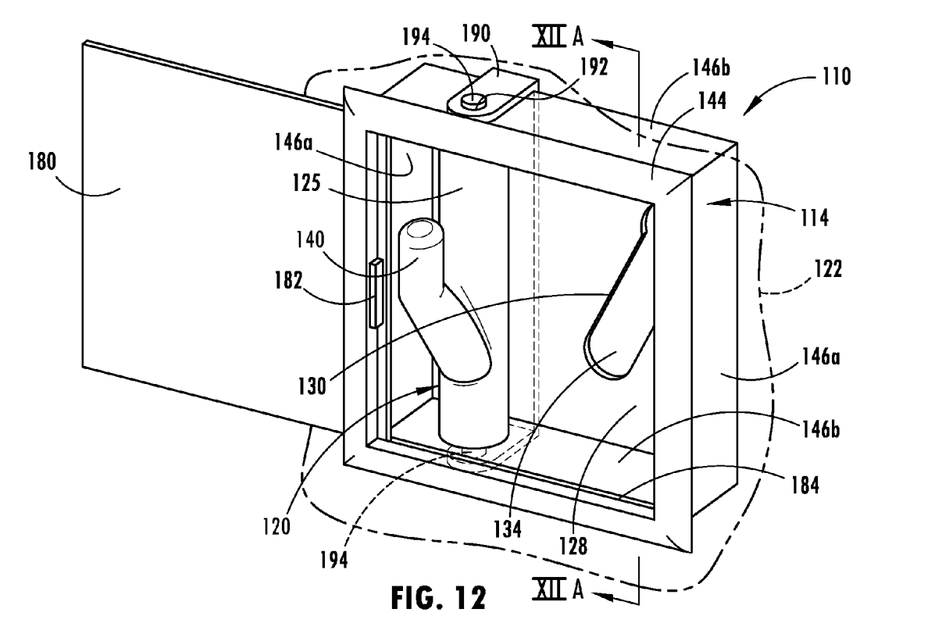
FIG. 12 is an elevated perspective view of the garment hook and guard mount assembly further illustrating the garment hook in a use position.
Figure 12A:
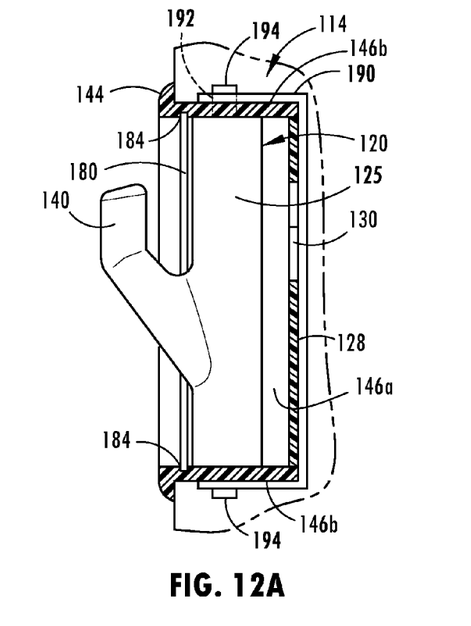
FIG. 12A is a cross-sectional view of the garment hook and guard mount assembly taken through line XIIA-XIIA of FIG. 12.

In the embodiment of FIGS. 10-12A, the mount assembly 110 has a front door 180 that covers an access aperture 200 and the internal space or compartment defined by the housing 114 to conceal components provided therein when the door 180 is in the closed position as shown in FIG. 10. The door 180 is slidable within a track 184 formed in the bezel 144 and/or top and bottom walls 146b between an open position as shown in FIG. 12 which exposes the internal components therein and the closed position shown in FIG. 10 which covers the components. The door 180 may include a handle 182 as shown to allow a user to engage and slide the door 180 between the open and closed positions. The door 180 may slide on a track 186 or other support structure when in the open position to provide added stability. It should be appreciated that the door 180 may otherwise be configured to move between open and closed positions, such as pivoting and other sliding arrangements.

The mount assembly 110 includes a garment hook 120 and a guard receiving aperture shown in the form as a keyhole slot 130, both of which are accessible via the front access aperture 200 of the housing 114 when the door 180 is in the open position. The garment hook 12 and keyhole slot 130 are thereby accessed via the access aperture 200 defined by the housing 114 and bezel 144 with the door 180 in the open position. The garment hook 120 is shown having a vertical rod 125 and a hook portion 140 extending therefrom to provide an upstanding vertical oriented hook for engaging and supporting clothing or other articles. The vertical rod 125 pivots about a vertical axis to rotate the hook portion 140 between a stored position within the housing 114 as seen in FIG. 11 and an outward extending use position as shown in FIG. 12. The vertical rod 125 includes first and second pivot pins 194 mounted at the respective top and bottom ends thereof. Pivot pins 194 engage respective openings 192 within a C-shaped steel clip 190 or other supporting structure that extends from the top wall to the bottom wall of the housing 114 and along the back side of housing 114 and may engage the underlying support structure 128. The C-shaped steel clip 190 provides structural support for the garment hook portion 140 to allow the hook 140 to support heavy articles. The C-shaped steel clip 190 may, in turn, be fastened or otherwise connected to the trim component 122 or underlying support structure 128.

With the door 180 in the open position, a user may rotate the garment hook 120 and its hook portion 140 from the stored position shown in FIG. 11 to the outward exposed hook position shown in FIG. 12. In this embodiment, the hook portion 140 is rotated by an angle of approximately ninety degrees (90°) so as to expose the hook portion 140 in a garment engageable position. In doing so, the vertical rod 125 and top and bottom pins 194 rotate within the opening 192 of the C-shaped steel clip 190. When the garment hook 120 is no longer desired for use, a user may simply rotate the garment hook 120 by ninety degrees (90°) in the opposite direction back to the stored position as shown in FIG. 12, and may then slide close the door 180 sideways to the closed position to cover and conceal the hook and guard mount components within the internal volume of the housing 114 to provide an aesthetically pleasing appearance.

The guard receiving aperture in the form of a keyhole slot 130 is shown formed in the underlying support structure 128 and accessible via the access aperture 200 defined by housing 114 when the door 180 is in the open position. Thus, the open door 180 allows access to an underlying vehicle body structure 128. The keyhole slot 130 is shown formed and exposed to receive a guard such as guard 70 shown in FIG. 6 in which the bulbous head 78 and fitting 76 engage the keyhole slot 130. The keyhole slot 130 may be engaged whenever the door 180 is in the open position and is accessible with the garment hook 120 in either the use or stored positions. The keyhole slot 130 is shown having an enlarged hole 132 at an upper end and a tapered slot 134 at a lower end with the keyhole slot 130 oriented at an angle in the embodiment shown. However, it should be appreciated that the keyhole slot 130 may have other shapes and sizes and orientations to engage and support the guard.

In use, a user may slide the door 180 to the open position by engaging handle 182 and applying sideways force. In the door open position, the garment hook 120 and keyhole slot 130 are exposed and accessible via the access aperture 200. If the garment hook 120 is desired, a user may rotate the garment hook 120 about the vertical axis by approximately ninety degrees (90°) to rotate the hook portion 140 forward to a use position such that the garment hook 120 is accessible to place an item thereon within the interior of the vehicle. When the garment hook 120 is not desired for use, a user may rotate the garment hook 120 and its hook portion 140 ninety degrees (90°) in the reverse direction to the stored position. When desired to utilize a guard, the guard may be installed into the mount assembly 110 by opening the door 180 and inserting the enlarged bulbous head 78 and its fitting 76 into the keyhole slot 130 via enlarged opening 132 and sliding the fitting 76 downward into the downward tapered slot 134 so as to retain the fitting 76 and guard in position therein. The fitting 76 may be inserted within the keyhole slot 130 with the garment hook 120 in either the use or stored positions. When the guard is no longer desired, a user may slide the fitting 76 out of the keyhole slot in the reverse direction to remove the fitting 76 from the mount assembly 110. Thereafter, the door 180 may be moved by sliding to the closed position to close the access aperture 200 and cover the garment hook 120 and keyhole slot 130.

It should be appreciated that the keyhole slot 130 of the guard mounting arrangement may otherwise be positioned within the housing 114 relative to the garment hook 120. It should be further appreciated that the mount assembly 110 may include a garment hook 120 without the keyhole slot 130 and guard mount arrangement according to a further embodiment.

It will be understood by one having ordinary skill in the art that construction of the described attachment system and other components is not limited to any specific material. Other exemplary embodiments of the invention disclosed herein may be formed from a wide variety of materials, unless described otherwise herein.

It is also important to note that the construction and arrangement of the elements of the garment hook and guard mount assembly as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle garment hook assembly comprising:
a housing mounted to a trim component on a vehicle;
a garment hook pivotally mounted to the housing; and
an access aperture formed in the housing;
wherein the garment hook pivots outward away from the housing about a vertical axis to a use position, and the access aperture allows access to an underlying vehicle body structure when the garment hook is in the use position and a stored position, wherein a guard extending outside the housing is removably mounted to the underlying vehicle body structure.

2. The garment hook assembly of claim 1 further comprising a vertical cover movably coupled to the housing to cover the garment hook and access aperture in a closed position and to expose the garment hook and access aperture in an open position.

3. The garment hook assembly of claim 2, wherein the cover slides on a track relative to the housing.

4. The garment hook assembly of claim 1, wherein the garment hook pivots about pins supported by a C-shaped clip.

5. The garment hook assembly of claim 4, wherein the garment hook comprises a hook and a rod that rotates about the vertical axis.

6. A vehicle garment hook assembly comprising:
a housing mounted to a trim component on a vehicle;
a garment hook pivotally mounted about a vertical axis to the housing; and
an access aperture formed in the housing;
wherein the garment hook pivots outward away from the housing to a use position, and the access aperture allows access to an underlying vehicle body structure when the garment hook is in the use position and a stored position, and wherein the underlying vehicle body structure comprises a keyhole slot.

7. The garment hook assembly of claim 6, wherein a guard is removably mounted to the keyhole slot in the vehicle body structure, the guard having a support rod terminating at an end thereof in a fitting.

8. The garment hook assembly of claim 7 further comprising a sliding vertical cover extending over the housing to cover the garment hook and access aperture in a closed position, wherein the fitting is disposed in the access aperture and is retained in the keyhole slot when the cover is in an open position.

9. The garment hook assembly of claim 8, wherein the guard comprises a net.

10. A vehicle garment hook assembly comprising:
a housing mounted to a trim component on a vehicle;
a garment hook pivotally mounted to the housing and pivotal about a vertical axis away from the housing to a use position;
an access aperture formed in the housing; and
a sliding cover extending over the housing within a track in the housing to cover the garment hook and access aperture in a closed position and to expose the garment hook and access aperture in an open position, wherein the garment hook pivots about pivot pins supported by a C-shaped clip.

11. The garment hook assembly of claim 10, wherein the cover is a vertical cover that slides in the track relative to the housing.

12. The garment hook assembly of claim 10, wherein the garment hook comprises a hook and a rod that rotates about the vertical axis.

13. The garment hook assembly of claim 10, wherein the access aperture allows access to an underlying vehicle body structure.

14. The garment hook assembly of claim 13, wherein the underlying vehicle body structure comprises a keyhole slot.

15. The garment hook assembly of claim 14, wherein a guard is removably mounted to the keyhole slot in the vehicle body structure, the guard having a support rod terminating at an end thereof in a fitting.

16. The garment hook assembly of claim 15, wherein the fitting is disposed in the access aperture and is retained in the keyhole slot when the cover is in the open position.

17. The garment hook assembly of claim 16, wherein the guard comprises a net.

18. A vehicle garment hook assembly comprising:
a housing mounted to a component on a vehicle;
a garment hook pivotally mounted to the housing; and
a vertical cover extending over the housing and sliding within a track to cover the garment hook, wherein the garment hook pivots outward away from the housing about pivot pins supported by a C-shaped clip about a vertical axis to a use position when the cover is in an open position.

* * * * *